Feb. 28, 1933.　　F. G. SCHWALBE　　1,899,640
GLASS TREATMENT
Filed Feb. 15, 1929
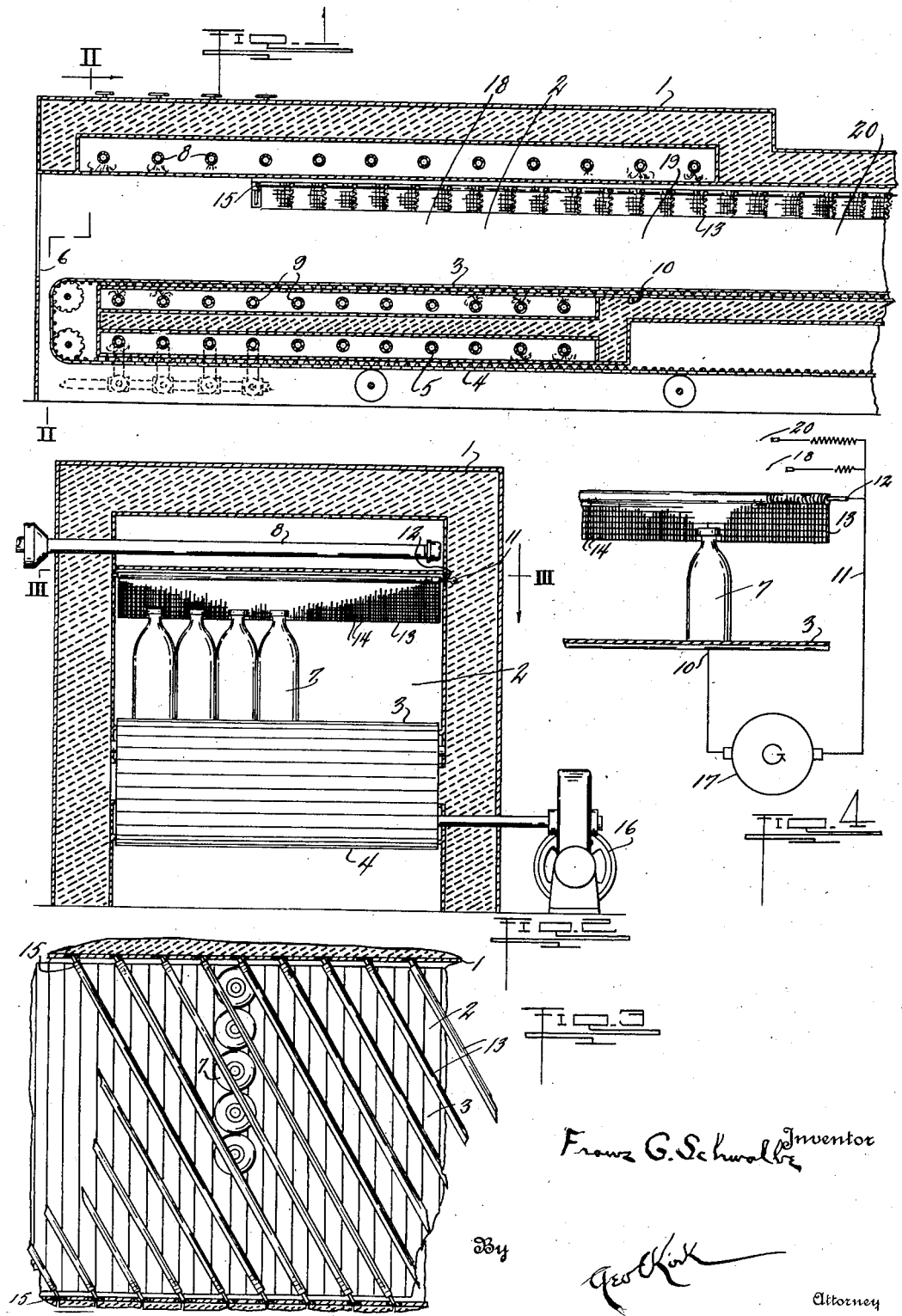
Franz G. Schwalbe Inventor
By Geo. Kirk
Attorney Patented Feb. 28, 1933

1,899,640

UNITED STATES PATENT OFFICE

FRANZ G. SCHWALBE, OF TOLEDO, OHIO

GLASS TREATMENT

Application filed February 15, 1929. Serial No. 340,036.

This invention relates to promoting stability of frangible articles as formed from plastic material.

This invention has utility when incorporated in the release of any internal strains tending to arise in glassware, and as herein disclosed advantage is taken of electrical conductivity to this end.

Referring to the drawing:

Fig. 1 is a fragmentary longitudinal section of a lehr having an embodiment of the invention incorporated therewith;

Fig. 2 is a section on the line II—II, Fig. 1;

Fig. 3 is a section on the line III—III, Fig. 2; and

Fig. 4 is a diagrammatic view of the circuit as adopted herein.

Lehr 1 is shown as having main chamber 2. In this lehr is shown endless conveyor having carrying section or portion 3 for the conveyor pans, and therebelow return reach section 4. The carrying section 3 is lengthwise through the chamber 2. The return reach or section 4 is herein shown as having its temperature controlled by heating means or burners 5 so that as this return section 4 comes to the vicinity of charging opening 6, the temperature of the lehr pans may be sufficiently high as not to chill ware 7. This glassware 7 as charged into the lehr chamber 2 at opening 6 is exposed at its upper portion to heating means or burners 8, while below the conveyor 3, additional heating means 9 may cooperate in still further bringing up the temperature of the ware 7.

In practice, this rise in temperature for the ware is of an extent short of melting the ware down but of an extent to approach plasticity for effective annealing. In this connection and hereunder, electric connection 10 to the conveyor 3, 4, causes said conveyor 3, 4, to act as a terminal means. Insulated from the housing 1 is conductor line 11 to terminal means 12, herein shown as asbestos sheeting or cloth 13, having woven thereinto copper wire 14 as electric conductor means to be sustained by such insulation curtain. This curtain 13, 14, has its clearance as to the upper reach 3 of the conveyor adjusted by suspension means 15 so that accommodation may be had for different heights of ware 7.

Electric motor 16 may serve to effect the desired rate of travel for the lehr conveyor as carrying the ware 7 so that such ware as warned to short of plasticity temperature but into the region of electrical conductivity for the ware approaches the curtains 13, 14. Electrical generator 17 may be effective for establishing an alternating current circuit to be closed between the terminal means of the conveyor and the terminal means of the curtain by the ware 7. The ware as thus in the circuit may, as an electrical resistance, have its temperature affected to become more uniform throughout the glass of the ware. This ware is in the circuit with the lehr traveling either continuously or intermittently. During this electric circuit completing condition of the ware, there is in the ware the action of the current upon the material of the ware as approaching plasticity. This material is accordingly responsive to electric current flow action, and as a result thereof responds to the current flow action in molecular adjustments in this circuit. This internal molecular adjustment with the temperature balance approximated throughout the ware is reached say at section 18 in the lehr. Thereafter, additional sections 19, 20, may effect temperature drop by reduction in current past the initial stage or condition so that this internal adjustment against cooling strains is effected in the production of a more stable product.

As this critical region is passed, the ware may be brought down in temperature with a considerable degree of rapidity. It accordingly follows that herein great capacity of output may be obtained rapidly and such output be of a superior character. These temperatures as to the number of burners used are effected by the temperature of the ware as supplied to the lehr as well as the outside temperature. Furthermore, a factor in this regard is the character of the ware itself and its temperature for approaching plasticity. The lehr is adjustable as to the number of burners and as to the electrical sections current capacity as well as extent of the sections to expose the ware to its treatment.

What is claimed and it is desired to secure by United States Letters Patent is:

1. Annealing equipment comprising a lehr having an endless conveyor embodying a carrying section in the lehr and a return section, heating means for the return section, electric terminal means for the conveyor, electric terminal means clear of the carrying section of the conveyor and in the lehr, and electric current supply to the terminal means to be completed by ware on the conveyor.

2. Annealing equipment comprising a lehr having an endless conveyor embodying a carrying section in the lehr and a return section, heating means for the return section, electric terminal means for the conveyor, electric terminal means clear of the carrying section of the conveyor embodying depending flexible curtains in the lehr, and electric current supply to the terminal means to be completed by ware on the conveyor.

3. Annealing equipment comprising a lehr having an endless conveyor embodying a carrying section in the lehr and a return section, heating means for the return section, electric terminal means for the conveyor, electric terminal means clear of the carrying section of the conveyor including adjustable height depending flexible curtains and in the lehr, and electric current supply to the terminal means to be completed by ware on the conveyor.

4. In glass manufacture the method of adjusting glass against internal strains arising therein including providing glass in form to maintain its shape as a solid formed article while approaching a molten state, sending an electric current through the formed article of glass, maintaining the temperature of the glass against rise to an extent to deform the glass, preserving the preformed shape of the article, and progressing the articles in series for being effective in multiple to complete said circuit.

5. In glass manufacture the method of annealing glass including providing glass in definite form, bringing such glass to a temperature approaching plasticity, causing a plurality of articles of said glass to progress, on a conductor and to extend therefrom to be engaged by a different conductor, for the glass articles to form a plurality of conductor sections in completing electric circuit connections between the conductors, subjecting the formed glass as in said circuit to the action of electric current independent of disturbing the form of the glass articles, and maintaining the glass temperature against fusion disturbance of its form.

6. Annealing glass comprising providing glass article of definite solid form, bringing the temperature of said glass up to approximate a molten stage, supporting said article against relative movement, causing said glass to be independent parts of an electric current circuit, and maintaining the glass temperature against deformation of the glass form.

In witness whereof I affix my signature.

FRANZ G. SCHWALBE.